Oct. 28, 1969 KENICHI YAMADA 3,475,554

OVER-WRITE PREVENTING PAPER FEED DEVICE FOR A REMOTE AUTOMATIC GRAPHIC TELECOMMUNICATION TRANSMITTER

Filed June 6, 1967 2 Sheets-Sheet 1

INVENTOR.
KENICHI YAMADA

BY Wallace, Kenyon & Dorn
ATTYS.

INVENTOR.
KENICHI YAMADA
BY Wallace, Kinzer & Dorn
ATT'YS

United States Patent Office 3,475,554
Patented Oct. 28, 1969

3,475,554

OVER-WRITE PREVENTING PAPER FEED DEVICE FOR A REMOTE AUTOMATIC GRAPHIC TELECOMMUNICATION TRANSMITTER

Kenichi Yamada, Tokyo, Japan, assignor to Nippon Electric Company Limited, Tokyo, Japan, a corporation of Japan Filed June 6, 1967, Ser. No. 643,971
Claims priority, application Japan, June 10, 1966, 41/37,480
Int. Cl. H04l *15/24, 15/34, 17/16*
U.S. Cl. 178—42 6 Claims

ABSTRACT OF THE DISCLOSURE

A manually operable paper feed device for the transmitter of a remote automatic graphic telecommunication transmitter that automatically produces a record feed signal to assure a paper feed operation at a receiver whenever paper is fed at the transmitter, eliminating any undesirable over-writing of data at the receiver. Friction feed rolls, sprockets, or the like are driven by a manually actuated knob to advance the transmitter recording paper; the shaft of the paper-advancing rolls is normally locked against rotation by engagement of a spring-biased pawl with a locking element mounted on the shaft. The pawl is released by movement of the transmitter pen to a given position on the transmitter platen, engaging a release lever connected to the pawl. The same movement of the pen throws a switch to initiate generation of a paper feed signal that is transmitted to the receiver, so that the receiver paper is advanced whenever the transmitter paper is fed. A cam on the paper feed shaft of the transmitter re-sets the pawl to locking position each time a paper feed operation is accomplished at the transmitter.

BACKGROUND OF THE INVENTION

The present invention relates to automatic graphic telecommunication equipment of the kind wherein a message or other graphic data is handwritten on a record paper at a transmitter, using a ball point pen or other recording stylus. The transmitter pen movements are transformed into electrical signals, which are transmitted through a suitable transmission line or other electrical link to a receiver. The receiver drives a recording pen to reproduce instantaneously the movements of the transmitter pen, thereby recording the data on a record paper at the receiver.

In this kind of communication equipment it is necessary, after the recording areas of the record papers are filled with graphic data, to replace the filled areas with new areas so that the communication may be continued successfully. In many of the conventional devices of this kind, the recording papers of the transmitter and receiver are fed simultaneously, by predetermined amounts, by means of electric motors included in the transmitter and receiver, respectively. Feeding of the record paper in the receiver is remote-controlled by a paper feed signal developed in the transmitter. This same signal is usually used at the transmitter to actuate the motor circuit that feeds the transmitter paper automatically.

A new-type transmitter for systems of this kind has been designed to be portable; it is of small size, light weight, and operable with batteries instead of commercial power lines. As a part of the size and weight reduction, the transmitter is constructed so that its record paper is fed by hand, without relying on motors. It is to be noted that the paper can be fed in the receiver by remote control effected by the paper feed signal as in the ordinary case, but that the paper in the transmitter cannot be fed automatically in synchronism with production of the paper feed signal. This means that feeding of the record paper in the transmitter is independent of that in the receiver and that the record paper of the transmitter might inadvertently be fed without accompanying remote-controlled feeding of the record paper at the receiver when the recording areas of the paper are filled with information at both the transmitter and the receiver and should be shifted for the next communication. That is, the paper at the receiver that is already filled with information may be over-written with other information, destroying intelligibility.

SUMMARY OF THE INVENTION

The object of this invention is to provide a record paper feeding device for a new-type portable transmitter of the kind mentioned above wherein the record paper is manually fed, which includes a mechanism for eliminating overwriting on the receiver record paper by establishing an interlocking relation between the remote control paper feed operation at the receiver and the manually actuated paper feed operation in the transmitter.

The record paper feed device of the invention is employed in a transmitter for a remote automatic graphic telecommunication system of the kind described above. It comprises a paper feed apparatus for manually advancing a record paper web across the platen of the receiver and releasable locking means for locking the paper feed apparatus to prevent paper advancement. Release means, for releasing the paper feed locking means, are locatel at a predetermined position relative to the transmitter platen; this release means includes a release lever engageable by the transmitter pen to actuate the release means whenever the transmitter pen is moved to that platen position. The transmiter includes means to generate a paper feed signal whenever the transmitter pen engages the release lever, assuring simultaneous feeding of paper at the receiver whenever a paper feed operation occurs at the transmitter. The device further comprises means for automatically resetting the locking means upon feeding of a predetermined length of paper across the platen.

DESCRIPTION OF THE PREFERRED EMBODIMENTS

Figures 1, 4, 5:
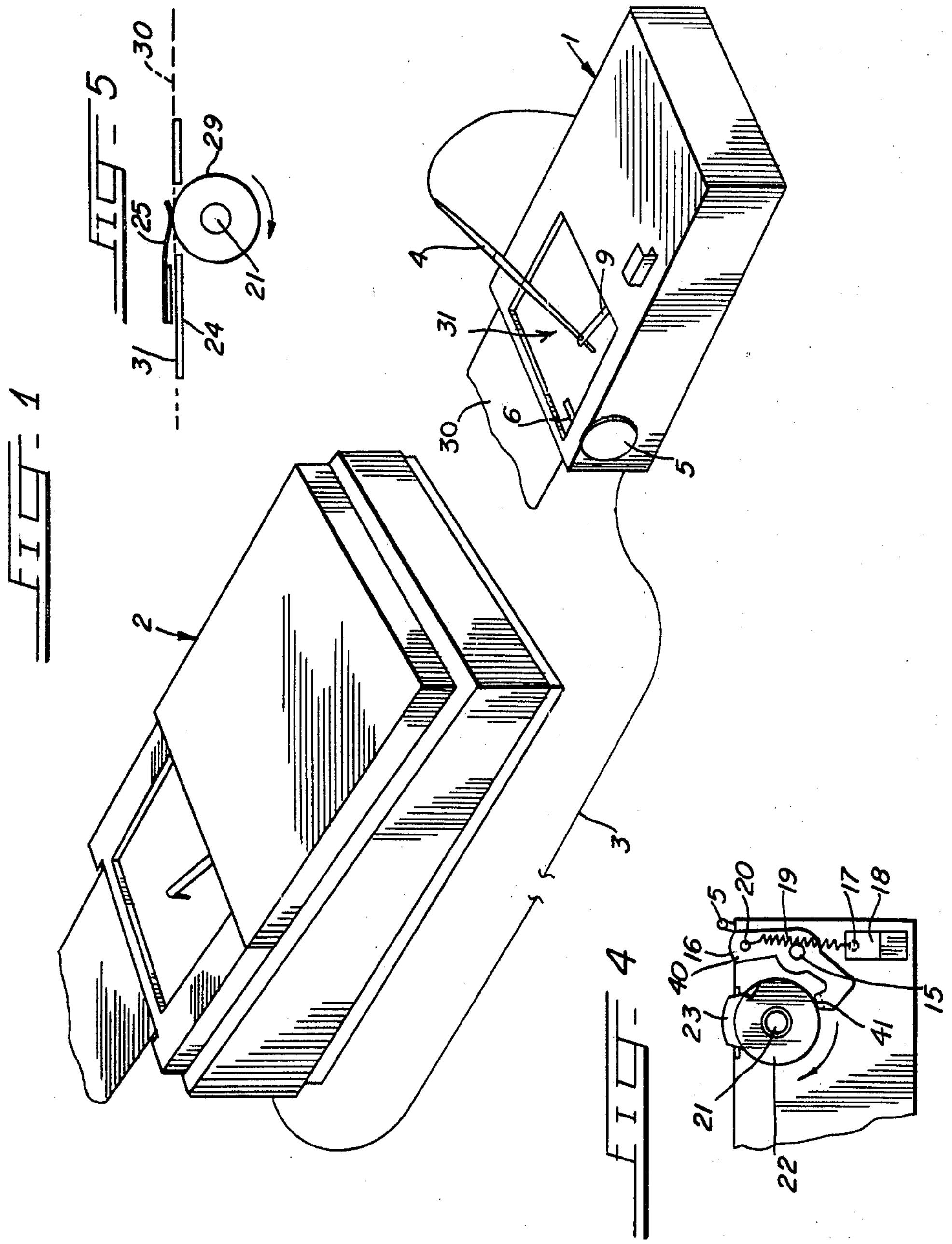
FIG. 1 is a perspective view of the transmitter and receiver of a remote automatic graphic information apparatus to which the present invention is applied.
FIG. 4 is a side elevation view of a portion of the recording paper feed device for use in explaining the present invention in greater detail.
FIG. 5 is a sectional view of a part of the paper feed device of FIG. 2 taken approximately along line 5—5 in FIG. 2.

FIG. 1 illustrates a transmitter 1 and a receiver 2 for a remote automatic graphic telecommunication system of the kind in which the present invention may be employed. The transmitter 1 is electrically connected to the receiver 2 by a suitable transmission line 3. The transmitter 1 includes an appropriate transmitting pen A, which may comprise a ball point pen or other recording stylus, for recording information on a sheet of paper 30 supported upon a platen 31.

A manually operable knob 5 on the transmitter 1 is employed to feed the recording paper 30 across the platen 31 when a new section of paper is required. Operation of the knob 5 is controlled by the paper feed device of the present invention, comprising a release lever 6. When the lever 6 is pushed forwardly by the transmitter pen 4, the paper feed device releases the knob 5 for rotation, permitting a paper feed operation. Otherwise, the knob 5 remains locked against rotation, as described more fully hereinafter.

Figure 2:
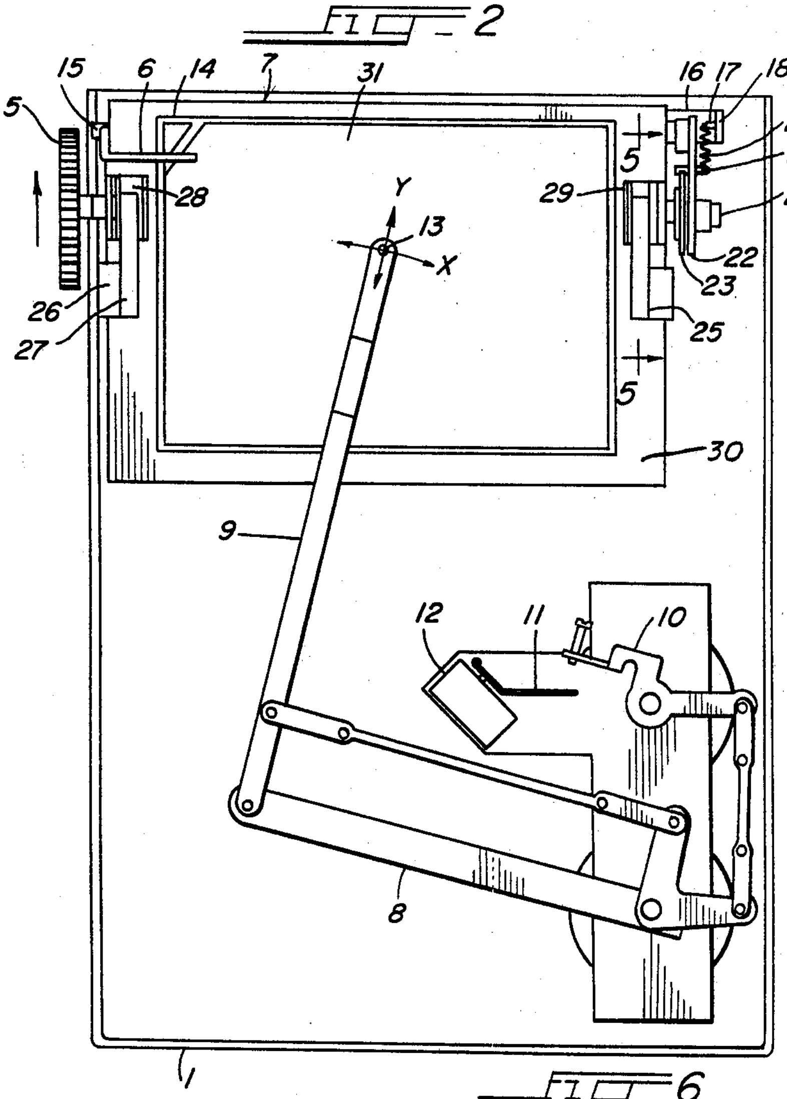
FIG. 2 is a plan view showing the inside of the transmitter with its cover removed.

FIG. 2 is a plan view of the transmitter 1 with the cover and the pen 4 removed. As shown in FIG. 2, the transmitter comprises a paper feed device constructed in accordance with the invention, generally indicated by reference numeral 7. A link mechanism 8 is coupled to the pen arm 9 for the transmitter pen 4 (see FIG. 1). An aperture 13 in the free end of the cantilever pen arm 9 is employed for mounting the pen on the pen arm.

The linkage 8 transfers the transmitter pen movements to a mechanical-electrical transducer comprising a pair of convertors that generate coordinate position signals representative of the pen movements, as along the coordinate axes X and Y. Appropriate electrical circuits (not shown) apply the position signals to the transmission line in a form suitable for utilization by the recorder 2.

The linkage 8, the convertors, the electrical circuits, and the other basic component parts of the transmitter 1, FIGS. 1 and 2, may be basically similar to those disclosed in United States Patent No. 2,583,535 and in other United States patents. Consequently, and because the present invention is not dependent upon the particular construction adopted for these components of the transmitter, further description and explanation of this part of the transmitter is omitted.

One lever 10 of the linkage 8 is aligned with the operating lever 11 of a switch 12 that is a part of a conventional circuit means for developing a record paper feed signal for transmission to the receiver 2. When the transmitter pen is moved into a triangular zone 14 in the upper left hand corner of the platen 31, the resulting movement of the pen arm 9 and the other elements of the linkage 8 causes the lever 10 to engage the switch lever 11, actuating the switch 12. Operation of the switch 12 initiates the generation of a paper feed signal that is transmitted to the receiver 2 (FIG. 1) to control a paper feed operation at the receiver. Again, the operating circuits for transmission of the paper feed signal and the paper feed apparatus required to utilize that signal, in the receiver 2, are well known in the art and need not be described herein.

The paper feed device 7, in the embodiment illustrated in the drawings, and particularly FIGS. 2–5, includes a spindle 32 upon which a supply roll 33 of recording paper is mounted. The paper web 30 extends from the supply roll 33 across the platen 31 (FIG. 5). The edges of the paper web 30 are engaged, from below, by two friction rolls 28 and 29 located at the sides of the platen. As shown in FIG. 5, the friction rolls are flush with the upper surface of the platen 31.

A pair of leaf springs 25 and 27 attached to brackets 24 and 26, respectively, engage the paper web and press the paper into contact with the friction rolls 28 and 29 (FIGS. 2 and 5). The rolls 28 and 29 may be provided with rubber or other relatively high-friction surfaces and the springs 25 and 27 may be smooth-surfaced metal springs so that the paper web 30 may be advanced across the platen 31 by rotation of the friction rolls.

The two friction rolls 28 and 29 are mounted on a common shaft 21. A locking disc 22 and a cam 23 are also affixed to the shaft 21, as is the knob 5. Thus, rotation of the knob 5 rotates the shaft 21, the disc 22, the cam 23, and the rolls 28 and 29 as a unit.

The release lever 6 is mounted on a shaft 15 disposed parallel to and spaced from the shaft 21. A bell crank 16 is mounted on the shaft 15 and is mechanically linked to the lever 6 so that both pivot as a unit. A pin 20 is mounted on the bell crank 16; one end of a tension spring 19 is connected to the pin 20. The other end of the spring 19 is attached to a pin 17 mounted on a fixed bracket 18 (FIG. 3).

Figures 3, 6:
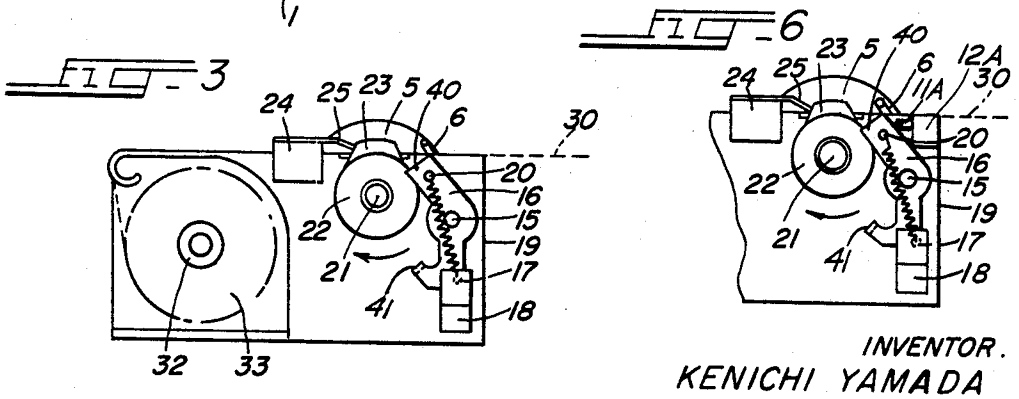
FIG. 3 is a side elevation view of the recording paper feed device shown in FIG. 2.
FIG. 6 is a detail elevation view, like FIG. 3, of a further embodiment of the invention.

With the paper feed device in the position shown in FIG. 3, the coil spring 19 applies a counterclockwise torque to the bell crank 16 around its shaft 15. As a result, a pawl 40 of the bell crank 16 engages a recessed portion of the locking disc 22 so that, if the locations and shapes of the shaft 21, shaft 15, lock disc 22, and bell crank 16 are designed suitably, the arrangement is kept in a locked condition. With the device locked up, the knob 5 cannot be rotated clockwise to feed the recording paper 30.

On the other hand, if the lever 6 is pushed to the right to the position shown in FIG. 4, the coil spring 19 applies a clockwise torque to the bell crank 16 around its shaft 15 to release the locking engagement between pawl 40 and disc 22. It is then possible to turn the knob 5 clockwise so as to feed the recording paper 30. When the knob 5 is turned one complete turn, and a predetermined amount of the recording paper 30 is fed to afford a fresh recording section on the platen 31, the cam 23 pushes the lower end of the bell crank 16 to rock the crank in a counterclockwise direction. The pivotal movement of the crank 16 re-positions the crank so that the coil spring 19 again applies a counterclockwise torque to the bell crank 16. Accordingly, the knob 5 is again locked after one complete turn and the paper feed device resumes its original position shown in FIG. 3.

From the foregoing description, it will be apparent that the basic paper feed apparatus of the paper feed device 7, comprising the knob 5, the shaft 21, the friction rolls 28 and 29, and the springs 25 and 27, is normally maintained in a locked condition by the releasable locking means comprising the disc 22 and the pawl 40 on the crank 16. The locking means is released by actuation of the release means that includes the release lever 6 mounted on the shaft 15 and the connection between the release lever 6 and the crank 16. The release operation is effected by movement of the transmitter pen into the corner 14 of the platen to engage the pen with the release lever 6. When the release means has been actuated, the paper feed apparatus can be manually actuated, using knob 5 to advance the paper web 30 across the platen 31 and thus replenish the paper at the transmitter for further recording operations.

The lever 10, the switch arm 11, and the switch 12 are part of a signal generating means that is actuated by the transmitter pen whenever that pen engages the release lever 6, since movement of the pen into engagement with the release lever always brings the pen into the corner position 14 on the platen and thereby acutates switch 12 as described above. This signal generating means develops a paper feed signal that is transmitted to the receiver 2 to assure simultaneous feeding of paper at the receiver whenever a paper feed operation occurs at the transmitter. Thus, over-writing is effectively prevented at the receiver because it is impossible to feed the transmitter recording paper without also feeding the receiver paper. Undesired duplication, or over-writing is thus effectively eliminated.

It is necessary to provide for automatic reset of the locking means comprising the disc 22 and the pawl 40 after each paper feed operation at the transmitter in order to maintain positive assurance against over-writing. This is accomplished by the automatic reset means, comprising the cam 23 and the lower arm 41 of the crank 16, which automatically resets the locking means to locked condition upon feeding of a predetermined length of paper across the platen 31 at the transmitter. The spring 19, of course, comprises a part of the locking means, the release means, and the resetting means, due to its overcenter toggle operation with respect to the crank 16.

In the embodiment of the invention illustrated in FIGS. 2–4, it is possible to effect a change of paper at the receiver 2 without requiring a replenishment of the paper supply on the platen 31 of the transmitter 1. This can be accomplished by moving the pen of the transmitter into the corner position 14 of the platen along a path that does not bring the pen into engagement with the release lever 6. This is not particularly disadvantageous, since it merely results in the waste of a short length of paper at the receiver and does not produce the unintelligible results that occur when an over-write is created by failure to feed the receiver paper.

A minor modification of the apparatus, as illustrated in FIG. 6, can be accomplished to avoid feeding of the receiver paper except when a paper feed operation is initiated at the transmitter. In the modification illustrated in FIG. 6, a switch 12A is incorporated in the transmitter at a location adjacent the bell crank 16, with the switch arm 11A projecting into position to be engaged by the bell crank as soon as the bell crank is moved sufficiently to release the locking engagement between its pawl 40 and the locking disc 22. The switch 12A, in this embodiment, is substituted for the switch 12 of the construction described in connection with FIGS. 2–4.

Utilization of the arrangement illustrated in FIG. 6 prevents the possibility of actuation of the circuits for generating the paper feed signal that is transmitted to the receiver 2 in response to movement of the pen into the corner 14 of the platen, FIG. 2, along a path that does not engage the release lever 6. That is, the embodiment of FIG. 6 requires the transmitter operator to initiate a paper feed operation at the transmitter by engaging the lever 6 in order to produce a paper feed signal that will energize the paper feed apparatus at the receiver. In all other respects, the operation of the embodiment of FIG. 6 is as described above for the first embodiment of the invention.

It will be recognized that the particular friction feed apparatus described in detail above, and particularly illustrated in FIG. 5, is not essential to the present invention. A sprocket feed, using appropriate sprockets instead of the friction rolls 28 and 29, cooperating with suitably spaced holes in the edge portion of the paper web 30, can be utilized if desired. Other forms of paper advancing apparatus can also be substituted without materially affecting the operation of the invention. It may also be desirable to mount a ratchet or other suitable means on the shaft 21 to prevent reverse movement of that shaft that would drive the transmitter paper back toward the roll 33. However, conventional expedients of this type are well known and hence need not be described herein.

I claim:

1. An over-writing prevention record paper feed device for the transmitter of a remote automatic graphic telecommunication system of the kind comprising a transmitter including a pen for manually recording data on a section of a first paper web disposed upon a writing platen, and a receiver electrically coupled to the transmitter and including a recording pen for substantially simultaneously reproducing the data recorded at the transmitter on a second paper web, said device comprising:

paper feed apparatus for manually advancing said first paper web across said transmitter platen to replenish the paper at the transmitter for further recording;

releasable locking means for locking said paper feed apparatus to prevent advancement of said paper at said transmitter;

release means, located at a predetermined position relative to said platen and connected to said locking means, for releasing said locking means to permit a paper feed operation at said transmitter, said release means including a release lever positioned above the platen and engageable by the side of the transmitter pen to actuate said release means upon movement of said pen to said predetermined position relative to said platen;

paper feed signal means, actuated by said transmitter pen whenever said pen engages said release lever, for generating a paper feed signal to be transmitted to said receiver to assure simultaneous feeding of paper at the receiver whenever a paper feed operation occurs at said transmitter;

and automatic reset means for automatically resetting said locking means to locked condition upon feeding of a predetermined length of paper across said platen independently of the time required for feeding the paper and independently of the time the pen remains in engagement with the release lever.

2. A paper feed device for a telecommunication system transmitter, according to claim 1, in which:

said paper feed apparatus comprises at least one paper feed roll mounted on a shaft and a manual operable drive member mechanically connected to that shaft;

said releasable locking means comprises a lock element affixed to said shaft and a pawl normally engaging said lock element to prevent rotation of said lock element and said shaft but pivotally movable, in a given direction, to release said lock element;

and the connection between said locking means and said release means comprises a connection between said pawl and said release lever.

3. A paper feed device for a telecommunication system transmitter, according to claim 2, in which:

said locking means pawl comprises one arm of a bell crank;

and said automatic reset means comprises a cam mounted on said shaft and engageable with another arm of said crank to pivot said pawl back in the opposite direction, toward locking engagement with said lock element, in response to rotation of said shaft.

4. A paper feed device for a telecommunication system transmitter, according to claim 3, in which a single spring, connected to said bell crank, maintains said crank in either locking or released position until said crank is positively actuated to the other position.

5. A paper feed device for a telecommunication system transmitter, according to claim 1, in which said paper feed signal means comprises a switch actuated directly in response to movement of said release lever.

6. An over-writing prevention record paper feed device for the transmitter of a remote automatic graphic telecommunication system of the kind comprising a transmitter including a pen for manually recording data on a section of a first paper web disposed upon a writing platen, and a receiver electrically coupled to the transmitter and including a recording pen for substantially simultaneously reproducing the data recorded at the transmitter on a second paper web, said device comprising:

paper feed apparatus for manually advancing said first paper web across said transmitter platen to replenish the paper at the transmitter for further recording;

releasable locking means for locking said paper feed apparatus to prevent advancement of said paper at said transmitter;

release means, connected to said locking means, for releasing said locking means to permit a paper feed operation at said transmitter, said release means including a manually operable release lever for actuating said release means;

paper feed signal means, actuated by said release lever whenever said release lever actuates said release means, for generating a paper feed signal to be transmitted to said receiver to assure simultaneous feeding of paper at the receiver whenever a paper feed operation occurs at said transmitter;

and automatic reset means for automatically resetting said locking means to locked condition upon feeding of a predetermined length of paper across said platen independently of the time required for feeding the paper and independently of the time the pen remains in engagement with the release lever.

References Cited

UNITED STATES PATENTS

| | | | |
|---|---|---|---|
| 1,943,839 | 1/1934 | Rhodes et al. | |
| 2,536,528 | 1/1952 | Baldwin | 178—42 |
| 2,618,704 | 11/1952 | Ress | 178—18 |
| 2,621,249 | 12/1952 | Ress | 178—18 |
| 3,125,638 | 3/1964 | Brumbach | 178—18 |

THOMAS A. ROBINSON, Primary Examiner

M. M. CURTIS, Assistant Examiner

U.S. Cl. X.R.

178—18